Sept. 7, 1954  C. K. SWARTZ ET AL  2,688,159
MOLDING APPARATUS
Filed April 10, 1951                    2 Sheets-Sheet 1
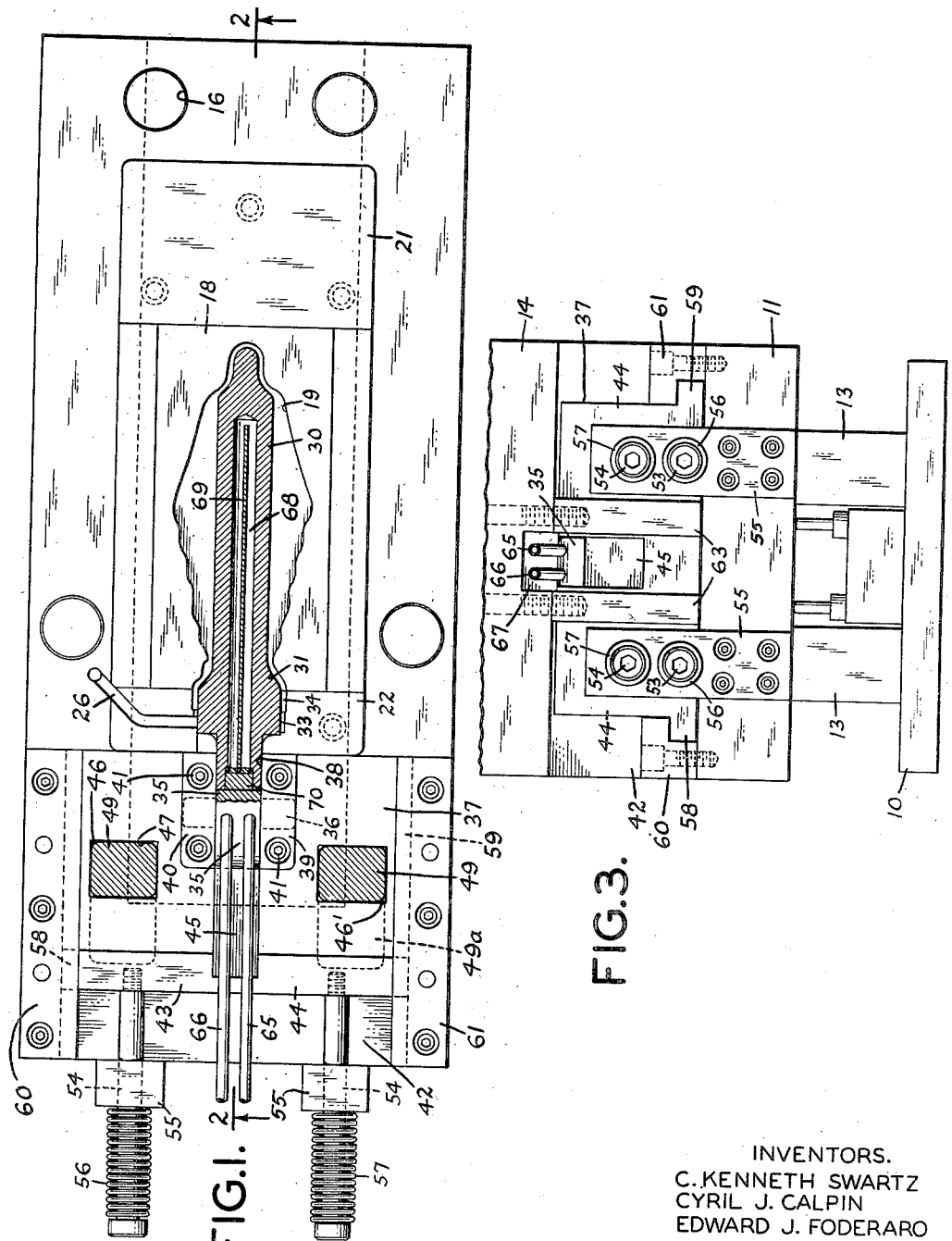
INVENTORS.
C. KENNETH SWARTZ
CYRIL J. CALPIN
EDWARD J. FODERARO
BY
THEIR ATTORNEYS.

Sept. 7, 1954  C. K. SWARTZ ET AL  2,688,159
MOLDING APPARATUS
Filed April 10, 1951  2 Sheets-Sheet 2
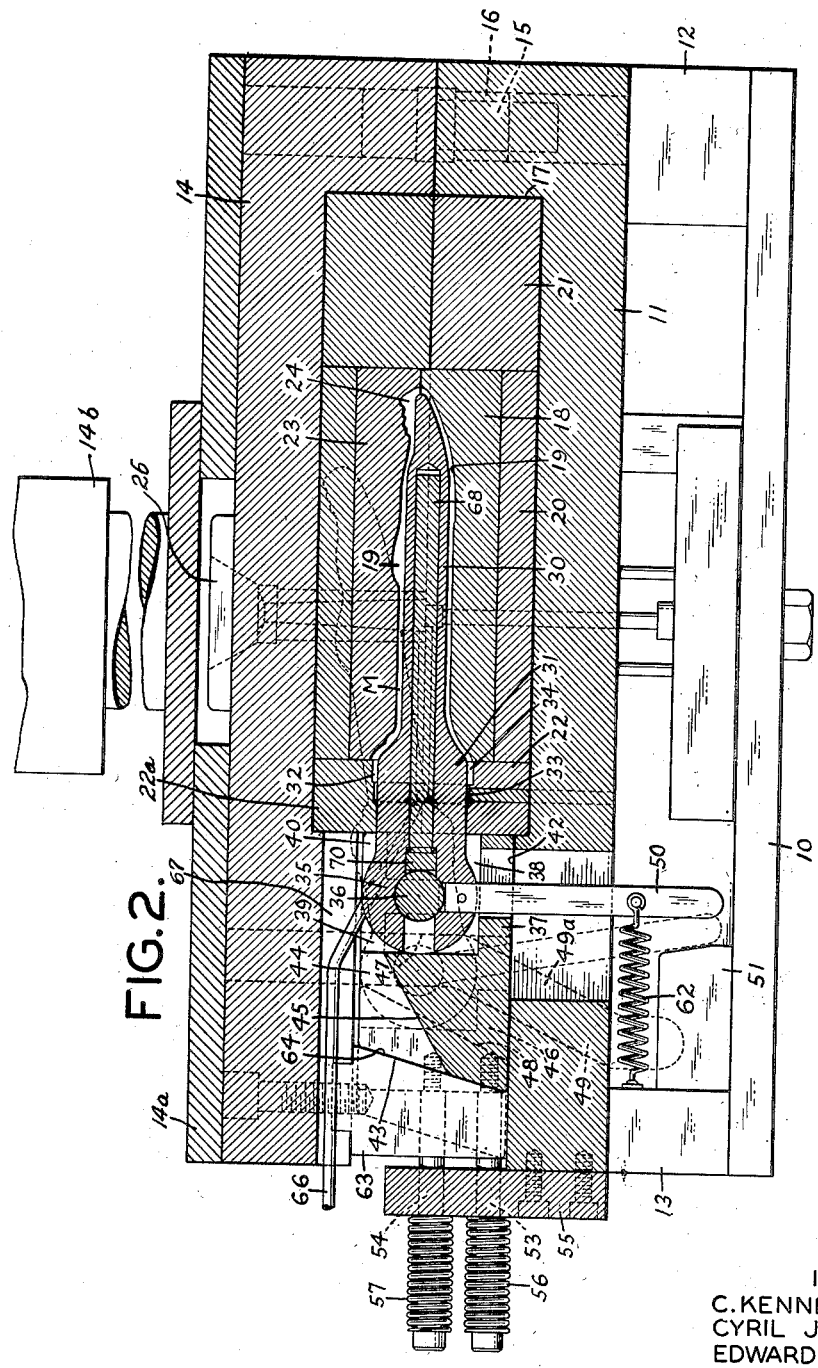
INVENTORS.
C. KENNETH SWARTZ
CYRIL J. CALPIN
EDWARD J. FODERARO
BY
Campbell, Brumbaugh, Free + Graves
THEIR ATTORNEYS.

Patented Sept. 7, 1954

2,688,159

UNITED STATES PATENT OFFICE 2,688,159

MOLDING APPARATUS

C. Kenneth Swartz and Cyril J. Calpin, Scranton, and Edward J. Foderaro, Dunamore, Pa., assignors to Consolidated Molded Products Corporation, Scranton, Pa., a corporation of Delaware Application April 10, 1951, Serial No. 220,298

6 Claims. (Cl. 18—42)

This invention relates to improvements in molds for molding articles of plastic, metal, and the like and it relates particularly to improvements in molds for the manufacture of elongated hollow articles such as statuettes and the like.

A mold used heretofore for the molding of articles of the type referred to above, requires an extremely long core. Because of the length of this core it is difficult to remove or withdraw the core from the molded part or article without resorting to a complicated arrangement of pneumatic or hydraulic cylinders having a long travel and a system of automatic controls interlocked in such a way that they operate the mold and the core in proper sequence.

The present invention provides a simplified mold structure in which the core of the mold is arranged to move lengthwise a short distance as the mold is opened in order to partially withdraw the core from the molded part or article and thereafter tip with respect to the mold sections to lift the article out of the mold cavity and thereby enable the article to be removed from the core by the operator without completely withdrawing the core from the mold.

The mechanism for producing the endwise and tipping or tilting movements of the mold can be so arranged that as the mold closes, the core swings down into its proper relation to the mold and then moves endwise into position to close the end of the mold cavity and thereby condition the mold to receive an additional charge of molding material.

Inasmuch as the core of the mold is moved only a relatively short distance, the mechanism does not require complicated hydraulic or pneumatic controls and by tipping after partial withdrawal, it frees the article from the mold so that an ejecting mechanism is not required to dislodge the articles from the mold.

For a better understanding of the present invention, reference may be had to the accompanying drawing in which:

Fig. 1 is a plan view of the lower section of a typical mold embodying the present invention with the core partly broken away and showing parts in section to disclose details of construction:

Fig. 2 is a view in section of a complete mold in closed position taken on a line corresponding to line 2—2 of Fig. 1; and Fig. 3 is an end view of the mold.

The mold chosen for purposes of illustration is a single cavity mold adapted for molding statuettes. The mold consists of a lower fixed bed plate 10 upon which is mounted a mold member or frame 11 of generally rectangular form by means of base blocks 12, 13, etc. Cooperating with the lower mold member 11 is an upper mold member or frame 14 also of generally rectangular shape which is adapted to be mounted on the platen 14a of a hydraulic press 14b of conventional type so that the upper mold frame 14 may be moved up and down to open and close the mold.

The mold members 11 and 14 are maintained in alignment by suitable aligning pins or dowels 15 and cooperating apertures and bushings 16 in the usual way. The lower mold plate or frame is provided with a cavity or recess 17 in which the mold sections are mounted. As shown in Fig. 2, the lower mold section may include a member 18 having a mold cavity 19 of suitable configuration therein. The member 18 rests upon a spacer block or plate 20 and is positioned in the recess 17 by means of the end block 21 and the end cavity block 22.

The upper section of the mold is similarly constructed and includes a mold member 23 having the cavity 24 therein. The sprue 26 is positioned alongside the mold cavity and is connected to the mold cavity.

As shown in Figs. 1 and 2, the core 30 is an elongated member which has sufficient taper or draft from its left-hand end to its right-hand end to enable it to be withdrawn from the article molded thereon. The core 30 has an enlarged base 31 which fits tightly in the opening 32 through the end cavity blocks 22 and 22a. The end cavity blocks when brought together have annular grooves 33 and 34 which communicate with each other and with the sprue 26 and the mold cavity M.

The outer or left-hand end of the core 30 is provided with an eye or ring portion 35 to receive a shaft or spindle 36 that is carried on a slide block 37. The spindle is received in semicircular notches in the side wall of an open ended recess 38 in the right-hand end of the slide block 37 and is retained in position by means of upper bushing members 39, 40 which are held in position by means of the machine screws 41. The core 30 can rock about the axis of the shaft 36 in a vertical plane into the dotted line position shown in Fig. 2.

The slide block 37 rests on a surface or platform 42 at the left-hand end of the mold frame 11 and can move toward and away from the mold element. The left-hand end 43 of the slide block is inclined downwardly and to the left from the vertical plane to form a cam surface. It also is provided with a recess 44 having a sharply inclined bottom portion 45 directly behind the eye 35 of the core 30.

The slide block 37 also has the passages 46, 46' through it on opposite sides of the eye 35, each passage having a right-hand edge 47 perpendicular to its lower face and an inclined left-hand edge 48. Each passage 46, 46' receives a cam bar 49 which is fixed to the top mold frame 14 and moves with it. The cam bar 49 has its lower end 49a inclined to the left substantially complemental to the inclination of the surface 48 of the recess 46 in the slide bar. With this arrangement, when the top plate or frame 14 is moved upwardly, the inclined end 49a of the cam bar 49 will engage inclined surface 48 of the slide bar and upon continued upward movement will cause the slide block 37 and the core to move to the left.

Shortly after the beginning of the movement of the core and the slide block to the left, the core is tipped or tilted upwardly by engagement of the lever 50, which is fixed to the ring 35, with a stop block 51 mounted on the base of the mold. Tilting of the core lifts the molded article from the lower cavity 19 so that the operator of the mold can easily remove the article from the core.

The slide bar 37 is guided on the platform 42 by means of a pair of guide bolts 53 and 54 at one end of the mold, these bolts being threaded into the slide bar and being slidably guided in an end plate 55 secured to the left-hand end of the lower mold frame 11. Cushioning springs 56 and 57 are interposed between the heads of the bolts and the plate 53 to limit the inward movement of the core 30. Also, the bar 37 has laterally extending flanges 58 and 59 at its opposite ends which are engaged slidably by undercut guide rails 60 and 61 secured to the platform 42 (Fig. 3).

During closing movement of the mold the reverse of the above-described action takes place. As the upper mold member 14 moves downwardly, the core rocks down into the lower cavity 19 under the action of the spring 62 which is connected to the lever 50 and to the spacer block 13. Continued downward movement of the frame 14 will engage the straight upper end of the cam bars 49 with the edges 47 of the openings 46, 46' of the slide member 37 to prevent outward movement of the core.

An additional locking and camming means is also provided for advancing the core endwise, this locking member comprising a wedge bar 63 having an inclined right-hand face 64. The wedge bar 63 is secured to the upper mold frame 14 and in its downward movement engages the inclined edge 43 of the slide bar 37 and forces the latter forwardly and locks it in position. The wedge bar 63 may be slotted or cut away at the zone in the plane of the core to enable cooling or heating conduits 65 and 66 to be connected to the core 30 or, as illustrated, may consist of two spaced apart wedge members on opposite sides of the heating conduits. These conduits extend through a groove 67 in the undersurface of the upper frame plate 14 and are connected to the bore 68 (Fig. 1) extending lengthwise of the core. When the core is tipped or tilted, the conduits are received in the recess 44 of the slide bar 37.

A partition 69 extends lengthwise of the bore 68 from its left-hand end to a point adjacent to but out of contact with the right-hand end of the bore.

Cooling or heating fluid introduced through the conduit 65 will flow lengthwise of the bore 68 toward the inner end of the core and then in a reverse direction to the conduit 66. The outer end of the passage or bore 68 is closed by means of a suitable plug and gasket 70, as shown in Figs. 1 and 2.

With the above-described mold construction, starting with the mold in open condition, the following sequence of operations takes place, the upper mold frame 14 moves downwardly and the slide bar 37 moves toward the right as the cam bars 49 slide through passages 46 and 46' and the right-hand inclined edge of each cam bar engages the upper corner of the edge 47 of the passages 46 and 46'. During movement of the core to the right, it is tipped downwardly by the action of the spring 62 until it is aligned with the lower mold cavity. Continued downward movement of the upper mold frame 14 causes an additional movement to the right of the core by engagement of the wedge bar 63 with the inclined edge 43 of the slide bar 37 thereby bringing the core into its desired position as the mold closes completely. The springs 56 and 57 retain the surface 43 of the slide bar against the locking wedge 60. With the mold closed, molding material is introduced into the mold cavity and through the sprue 26 and after the material is set or hardened, the mold frame 14 is raised by the press. As the mold opens, the core 30 is moved to the left by means of the cam bar 49, thereby partially stripping the molded article from the core. Continued opening movement of the mold causes the lever 50 on the core to engage the stop block 51 and tilt into the dotted line position. Inasmuch as the mold is open and the article has been released from the mold cavities and the core, the article can be withdrawn easily from the core by the operator.

From the preceding description of the typical mold embodying the invention, it will be seen that the mold enables easy release of the molded article from the core and the mold cavities under simple mechanical control whereby the parts of the mold may be positioned accurately and retained firmly in their positions during a molding operation.

It will be understood that the mold is susceptible to considerable modification and that one or more cavities may be provided in a molding apparatus and that other changes in the actuating mechanism for the mold may be made without departing from the invention. Therefore, the form of the invention described above should be considered as illustrative and not limiting the scope of the following claims.

I claim:

1. A molding apparatus comprising a mold having a pair of relatively movable mold members provided with confronting faces forming a mold cavity therebetween, means to move said members away from and toward each other to open and close said mold, an elongated core member extending through one end of said mold into and lengthwise of said cavity, means supporting said core member for endwise pivoting movement relative to said mold, and means responsive to opening of said mold to move said core member endwise and, thereafter, pivotally and means on one of said mold members in the path of a molded article on said core member for retaining said article against endwise movement with said core member to partially strip said article from said core upon endwise movement of said core member.

2. A molding apparatus for molding hollow objects, comprising a pair of mold members having recesses in their confronting faces to form a molding cavity between said members, an elongated core member extending between said members into and lengthwise of said cavity, means supporting said mold members for closing and opening movements, means supporting said core member for endwise movement and for pivoting movement relative to said mold members means for partially stripping said article from said core member during the endwise movement of said core member, and means to open and close said mold members and to move said core member endwise and pivotally in sequence.

3. A molding apparatus comprising a mold having a pair of relatively movable opposed mold members provided with confronting faces forming a mold cavity therebetween, means to move said mold members toward and away from each other to close and open said mold, an elongated core member extending through one end of said mold and between said members into and lengthwise of said cavity, means supporting said core member for endwise and pivoting movement relative to said mold, means including a cam member on one of said mold members for first moving said core member endwise and thereafter moving it pivotally as said mold is opened and means on one of said mold members in the path of a molded article on said core member for retaining said article against endwise movement with said core member to partially strip said article from the core member during its endwise movement.

4. A molding apparatus comprising a mold having a pair of relatively movable opposed mold members provided with confronting faces forming a mold cavity therebetween, means to move one of said mold members toward and away from the other mold member to close and open said mold, a core member extending through one end of said mold and between said members into and lengthwise of said cavity, means supporting said core member for endwise and pivoting movement relative to said mold, a cam member on said one of said mold members for first moving said core member endwise, means responsive to the endwise movement of said core member for moving it pivotally as said mold is opened and means for partially stripping said article from said core member during the endwise movement of said core member.

5. A molding apparatus comprising a mold having a pair of relatively movable mold members provided with confronting faces forming a mold cavity therebetween having an opening at one end of and between said mold members, means to move one of said mold members toward and away from the other mold member to close and open said mold, a guide adjacent to said other mold member, a slide member movable in said guide toward and away from said other mold member, a core member pivotally mounted on said slide member and extending endwise through said opening into said cavity, cam means on said one mold member for moving said slide member away from said other mold member and said core member endwise as said mold is opened and means on said other mold member in the path of a molded article on said core member for retaining said article against endwise movement with said core member to partially strip said article from said core member during its endwise movement.

6. A molding apparatus comprising a mold having a pair of relatively movable mold members provided with confronting faces forming a mold cavity therebetween having an opening at one end of and between said mold members, means to move one of said mold members toward and away from the other mold member to close and open said mold, a guide adjacent to said other mold member, a slide member movable in said guide toward and away from said other mold member, a core member pivotally mounted on said slide member and extending endwise through said opening into said cavity, cam means on said one mold member for moving said slide member away from said other mold member and said core member endwise as said mold is opened, means for partially stripping said molded article from said core member during the endwise movement of said core member and cooperating elements connected to said core member and said guide for moving said core member pivotally away from said other mold member after a predetermined movement of said slide member away from said other mold member.

References Cited in the file of this patent

UNITED STATES PATENTS

| Number | Name | Date |
| --- | --- | --- |
| 1,688,417 | Grubman | Oct. 23, 1928 |
| 1,989,363 | Iverson | Jan. 29, 1935 |
| 1,993,438 | Flammang et al. | Mar. 5, 1935 |
| 2,324,978 | Lohrand et al. | July 20, 1943 |
| 2,421,058 | Eckstein | May 27, 1947 |